United States Patent [19]
Elliott

[11] 3,852,870
[45] Dec. 10, 1974

[54] METHOD OF PRODUCING ARTICLES FROM SHEET-LIKE MATERIAL

[76] Inventor: Stanley B. Elliott, 7125 Conelly Blvd., Bedford, Ohio 44146

[22] Filed: Mar. 14, 1973

[21] Appl. No.: 341,260

[52] U.S. Cl.............. 29/413, 29/160.6, 29/193.5, 29/DIG. 37, 29/DIG. 40, 113/116 F, 113/116 Y, 113/116 BB
[51] Int. Cl............................................ B23p 17/00
[58] Field of Search............ 29/160.6, DIG. 3, 412, 29/413, DIG. 30, DIG. 37, DIG. 40, 183, 193.5; 113/116 Y, 116 F, 116 Z, 116 BB; 161/19, 7

[56] References Cited
UNITED STATES PATENTS

| 326,963 | 9/1885 | Evans............................ 29/DIG. 40 |
| 1,037,122 | 8/1912 | Buffinger et al................ 113/116 F |
| 1,353,565 | 9/1920 | Craig................................. 29/160.6 |
| 1,378,501 | 5/1921 | Wall................................ 29/DIG. 40 |
| 2,100,181 | 11/1937 | Barrows......................... 29/DIG. 40 |
| 2,447,466 | 8/1948 | O'Reilly........................... 113/116 F |

Primary Examiner—C. W. Lanham
Assistant Examiner—Victor A. DiPalma
Attorney, Agent, or Firm—Baldwin, Egan, Walling & Fetzer

[57] ABSTRACT

A method of producing articles from relatively rigid sheet-like stock material and in a manner whereby stock waste is minimized or eliminated. The articles are blanked or cut out of a strip of stock material (as by means of stamping) with a plurality of slits or cuts formed in the blank defining in part the blank sections that are subsequently bent to define the component parts of the finished article. The exterior periphery of the blanks are defined by smooth flowing curves, and alternate blanks are reversed end to end during the cutting thereof and maintained in juxtaposed interfitted relation with the adjacent blanks, to insure zero or minimum scrap loss in the stock strip. The finished articles are defined by smoothly flowing curved sections of the blank as cut from the strip stock material and bent to the desired configuration.

12 Claims, 10 Drawing Figures

PATENTED DEC 10 1974 3,852,870
SHEET 1 OF 2

PATENTED DEC 10 1974

METHOD OF PRODUCING ARTICLES FROM SHEET-LIKE MATERIAL

This invention relates to a novel process for producing articles from sheet-like stock material, such as, for instance, sheet metal, and more particularly a process in which the articles are formed from a strip of the stock material with zero or minimum resultant scrap. The invention also provides novel finished articles of a decorative nature which are defined by smoothly flowing curved sections of the component parts of the blank.

BACKGROUND OF THE INVENTION

It is known in the art to cut or form blanks from sheet-like material such as, for instance, a strip of stainless steel stock, and then deform or bend the blank into a finished article.

The present invention provides a process for the production of articles, and particularly decorative articles, defined by flowing curved lines, and wherein blanks for forming the articles are stamped or cut from a strip of sheet stock material, and with minimum or zero scrap loss from the strip.

Accordingly, it is an object of the invention to provide a novel process for the production of articles from strip stock material and in a manner wherein substantially no scrap is produced.

A still further object of the invention is to provide a novel process for the production of articles from strip stock material, wherein blanks for forming the articles are cut from the stock material with the blanks being symmetrically formed about an axis extending transverse of the longitudinal axis of the stock material, and wherein the exterior configuration of the blanks are defined by flowing curved lines.

A still further object of the invention is to provide a novel process for the production of articles from flat strip stock material, wherein the blanks for the articles are defined by exterior flowing curved lines and wherein the blanks include a body portion, a neck portion, a head portion, and wherein slits are provided in the blank which define sections which are adapted to be subsequently deformed into finalized defining portions of the finished article, and wherein the blanks are cut from the strip stock are disposed in juxtaposed interfitted relation, to minimize or provide for zero production of scrap from the strip.

A still further object of the invention is to provide a process of the aforegoing type wherein the head portion is provided with slits along the peripheral edges thereof defining sections which are adapted to be subsequently deformed to provide anchors for simulated eye portions for the finished article.

A further object of the invention is to provide a process of the aforedescribed type which is utilized to manufacture decorative articles from the flat strip stock material, and wherein said decorative articles are in the form of simulated birds or the like.

A still further object of the invention is to provide a novel decorative article formed from a blank cut out of flat strip material, and bent about a lengthwise major axis extending along the plane of the blank for the article.

Other objects and advantages of the invention will be apparent from the following description taken in conjunction with the accompanying drawings wherein:

DESCRIPTION OF PREFERRED EMBODIMENTS

Figure 3:
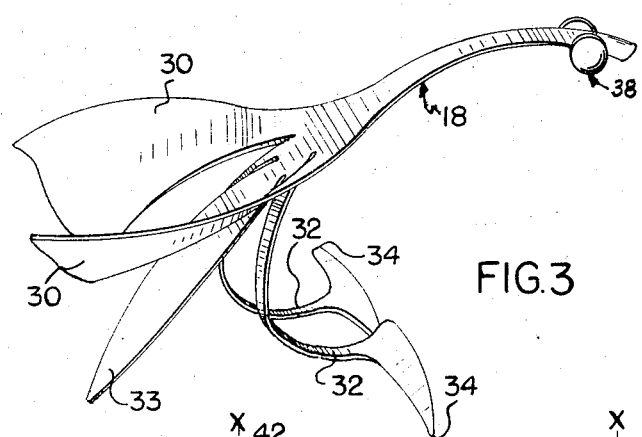
FIG. 3 is a perspective illustration of a finished article which is formed from the blanks in the lowermost longitudinal row of FIG. 1.

Referring now again to FIG. 1, there is illustrated a punching or stamping machine 10 operating on a strip of sheet-like stock material 12. Strip 12 may be of metal, such as for instance, 24 gauge stainless steel, or may be some form of plastic material, such as plexiglass, from for instance 0.06 of an inch in thickness, up to 3/16 inch thickness. The major physical characteristic that the strip 12 has to possess is that the blanks 14,16 may be readily cut or stamped from the strip of stock material, and may be subsequently deformed or or bent expeditiously into the smooth flowing curved configuration of the finished article (e.g., 18- FIG. 3).

Also, the finish on the stock material should be pleasing to the eye, and the cost of the stock material has to be reasonable.

Figure 1:
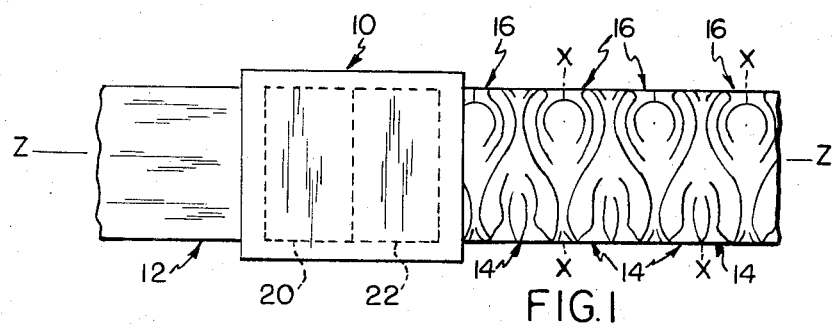
FIG. 1 is a diagrammatic, top plan illustration of a punching press receiving a strip of stock material, with two different blank arrangements being cut from the strip as it passes through the punching press; one blank arrangement is reversed end-to-end as compared to the other blank arrangement, with the blanks being disposed in interfitted juxtaposed condition with the adjacent blanks, to maintain minimum or zero scrap loss.
Figures 4, 5:
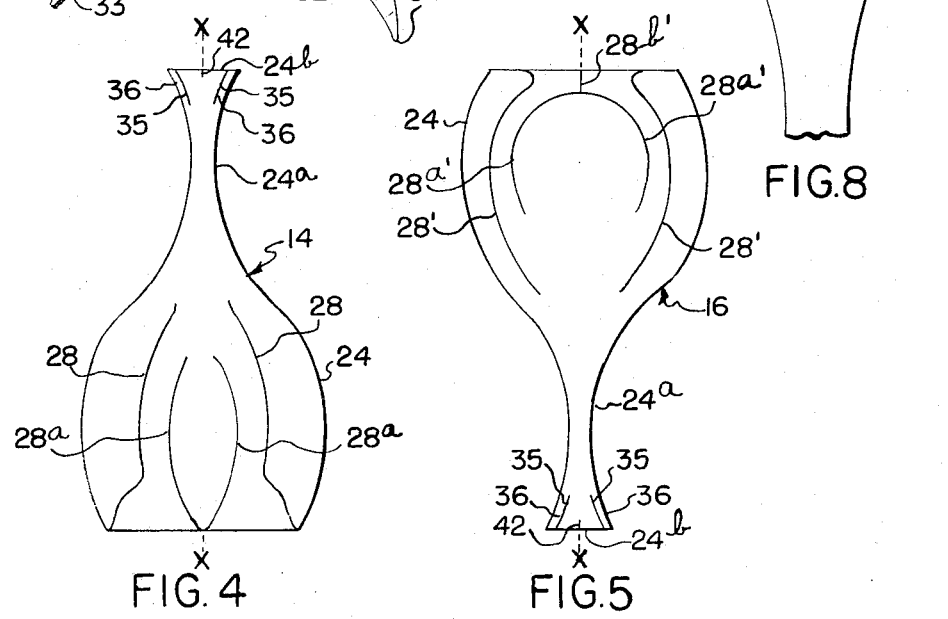
FIG. 4 is an enlarged, plan view of one of the blanks from which the FIG. 3 article is formed.
FIG. 5 is an enlarged, plan view of one of the blanks from the uppermost longitudinal row of blanks in FIG. 1.

As can be best seen from FIGS. 4 and 5, the configuration of the blanks 14 is somewhat different from the configuration of the blanks 16 formed from the strip 12, with each blank 14 being formed in preferably a one step operation for instance on stamping or cutting die section 20 of the machine 10, while each blank 16 may be formed from the stamping or cutting die section 22 of the machine in a one step operation. Each of the formed blanks comprises a relatively large body portion 24, a generally elongated neck portion $24_a$ and a head portion $24_b$. Each blank is stamped or cut from the strip stock material as aforementioned, and about a lengthwise major axis X—X which extends generally transverse to the longitudinal axis Z—Z of the strip 12 (FIG. 1). The exterior defining side edges of the blanks 14 and 16 are smoothly curved lines of generally S-shaped nature, with alternate blanks (e.g., 16) being reversed end-to-end, and with the blanks being disposed in interfitted, juxtaposed condition, so that the body portion of for instance a blank 16 fits into the smoothly curved lines defining the head and neck portions of the adjacent blanks 14. Accordingly, substantially no scrap is produced, and the blanks are formed from the strip stock material in an expeditious, economical manner.

As can be seen from FIG. 1, other cuts are made in each of the blanks, in addition to the cuts utilized to produce the exterior configuration of the respective blank. Such other cuts in the embodiment illustrated comprise slits or cuts 28,28a in blanks 14, and cuts 28 ,28a' in blanks 16, with slits 28 or 28' partially defining portions of the blank which are adapted to be subsequently bent or deformed into wing portions 30 (FIG. 3) for the finished article, and with slits or cuts 28a, 28a' partially defining portions of the blank which are adapted to be subsequently bent or formed into foot and leg portions 32 for the finished article. The cuts or slits 28,28a and 28',28a' are made symmetrically on opposite sides of the respective major axis X—X of each blank. After the blanks are formed from the stock sheet or strip 12, the various integral portions thereof defined in part by slits 28,28a or 28',28a' can be bent or deformed into the smoothly flowing sections as illustrated for instance in FIG. 3, to define the finished decorative article. As can be seen from FIG. 3, the distal end of the tail portion 33, and the distal ends 34 of the foot portions provide three point support for the finished article. Also in blank 16, a slit or cut 28b' separates the sections of the blank from which the foot and leg portions are formed.

Figure 6:
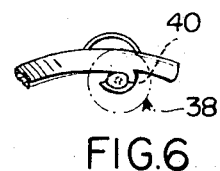
FIG. 6 is a fragmentary illustration of the head portion of one of the finished articles, showing the slit sections thereof which are bent into anchoring means for the simulated eyes of the article.
Figure 7:
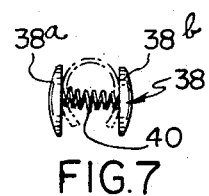
FIG. 7 is a front end elevational view showing the simulated eye portions of the article as anchored on the anchoring means of FIG. 4, and as connected by resilient means for holding the simulated eye portions onto the article.
Figure 8:
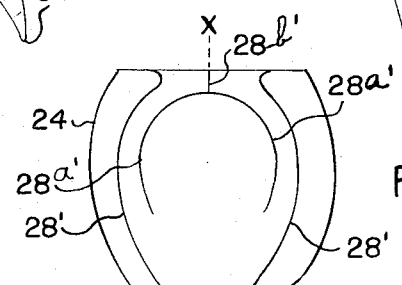
FIG. 8 is an enlarged, top plan view of the head portion of one of the blanks, showing the slits formed therein which are adapted to be subsequently deformed to form the anchoring sections of FIG. 6 for the simulated eyes of the article, and showing in dotted lines the bend lines about which the head portion is adapted to be deformed, to form the finalized configuration of the head of the finished article.

Referring now to FIGS. 6, 7 and 8, it will be seen that the head portion $24_b$ of the blank is formed with slits or cuts 35 which partially define sections 36 (FIG. 6) which are deformed or bent into hook-like anchoring sections on the respective head portion, to provide a retaining means for simulated eye means 38.

Simulated eye means 38 may comprise round button-like members $38_a,38_b$ which may be formed of any suitable material, such as for instance metal, plastic, mother-of-pearl or the like, and which are preferably connected by a resilient means 40, which in the embodiment illustrated is a yieldable spring member, connecting the button-like simulated eye portion $38_a,38_b$ together. The spring member 40 draws the members $38_a,38_b$ toward the confronting surfaces of the head portion of the finished article, which has been formed from portion 24b of the blank by bending or deforming the latter along the bend lines 41, into a generally inverted U-like shape in end elevation (FIG. 7). A notch or slit 42 can be provided generally centrally of the transverse edge of the head portion $24_b$ of the blank for facilitating its deformation into the curved configuration illustrated in FIG. 7. It will be seen that the resilient means 40 interlocks with the hook shaped sections 36 on the head of the article to firmly retain the simulated eyes 38 on the finished article.

The stock strip 12 is preferably covered by a protective coating of some type, such as for instance pressure adhesive paper, so that after completion of the stamping or cutting operation on the stock, the paper can be readily removed from the surface of the stock material, to present a finished appearance to the article without further work operations. The stock material utilized may have a brush or mirror finish, so that when the blanks are bent or deformed into finalized configuration for the finished article and the protective coating is removed from the surface of the stock, the article is ready to market without further processing or work thereon.

Figure 2:
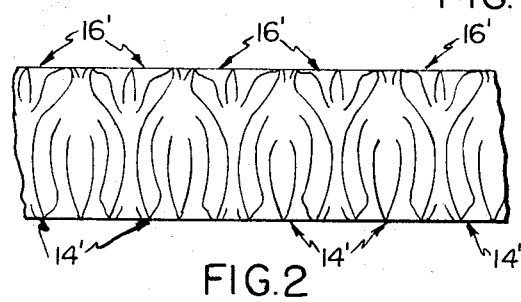
FIG. 2 is a top plan, diagrammatic illustration of another strip of stock material showing further blank arrangements formed thereon, with alternate blanks being reversed end-to-end similarly to FIG. 1, for maintaining minimum scrap loss in the strip of stock material.

Referring now to FIG. 2, there is illustrated a different configuration of interfitted blanks, with the blanks 14' being of a much shorter neck type as compared to the length of the neck portions of the blanks 14 and 16 of FIG. 1. However, in other respects the blanks 14' and 16' are generally similar to those of blanks 14 and 16 respectively, and include the smoothly curving side edges defining the exterior configuration of the respective blank, as well as the interior cuts or slits defining sections which are adapted to be subsequently bent or deformed into the flowing curved portions of the finished article. The head portions have slits or cuts made therein for a similar purpose as those of FIG. 1 embodiment.

It will be noted that while the blanks 14' for the FIG. 2 embodiment are of the short neck variety, the blanks 16' in FIG. 2 are of the long necked variety, with the body portion of the blanks 14' of FIG. 2 being received in juxtaposed interfitting relation with the elongated neck and associated head portions of the blanks 16' of FIG 2 embodiment. The finished article that is produced utilizing the blanks of FIG. 2 will be generally similar to that of FIG. 3, comprising the rearwardly extending wing portions and the forwardly bent leg and foot portions, with the article being adapted to be supported on the distal end of the tail and on the leg and foot portions. However, it will be understood that with the blanks 14', the neck will be short rather than of the elongated configuration of the types formed for instance from the blanks 16', 14 and 16.

Figure 9:
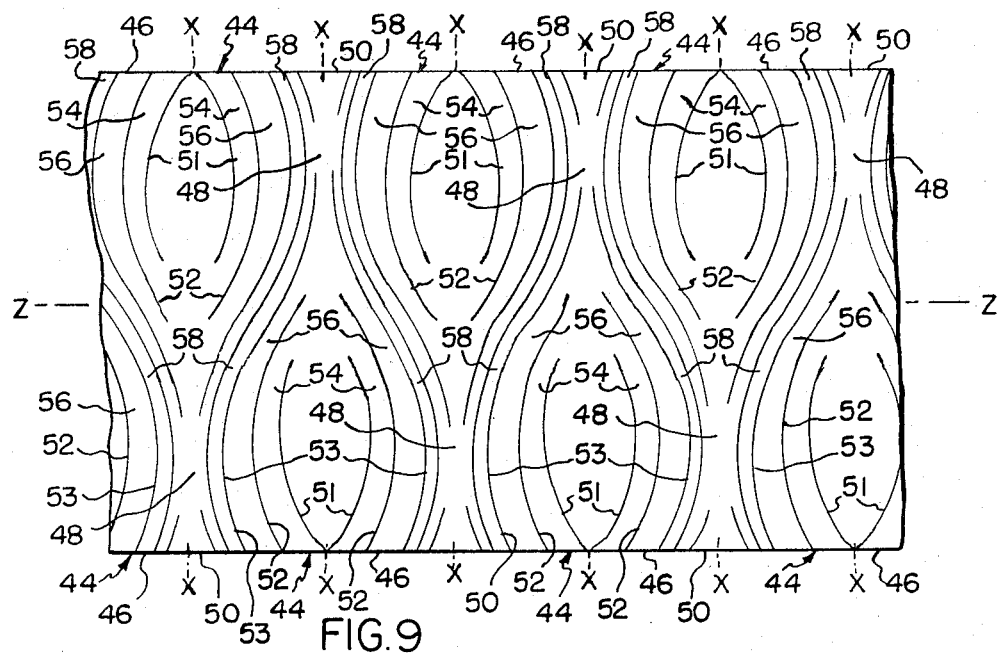
FIG. 9 is an enlarged, top plan view of another section of strip stock material on which blank have been formed in accordance with the invention, with the blanks being alternated end-to-end and disposed in interfitting, juxtaposed condition, for realizing substantially no stock scrap loss, and wherein all of the blanks in the strip are identical.

Referring now to FIG. 9, there is shown a strip of stock in which the blanks 44 cut or stamped from the strip of stock are all of the same configuration and are not of alternately different configurations as in the FIGS. 1 and 2 embodiments. Blanks 44 are likewise defined by curved smoothly flowing lines which define a body portion 46, a neck portion 48 and a head portion 50, for each of the blanks. The blanks are cut or slit interiorly thereof by smoothly curved lines on opposite sides of the lengthwise major axis X—X of the respective blank which extends generally transverse of the strip of stock material, and substantially perpendicular to the longitudinal axis of the strip of stock.

Figure 10:
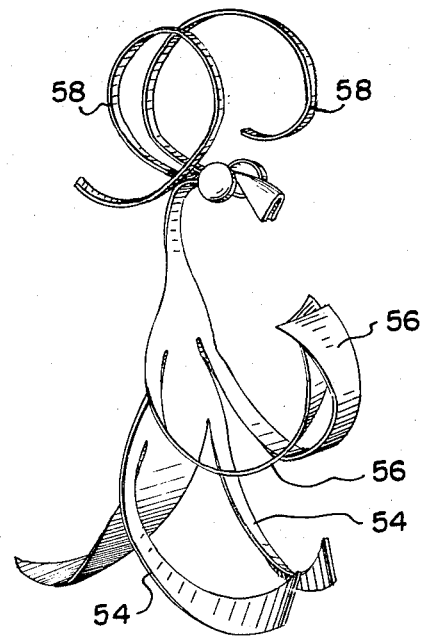
FIG. 10 is a perspective illustration of a finished article formed from one of the blanks of FIG. 9 and illustrating the smoothly flowing curved sections of the article which define the pleasing and decorative nature thereof.

The interior cuts or slits 51, 52 and 53 partially define respectively, feet and leg portions 54, wing or arm portions 56, and sections 58 which are adapted to be deformed or bent into horns and antennas. Sections 58 which are adjacent the exterior periphery of the respective blank and which are of a relatively narrow width as compared to for instance the width of the arm or wing portions 56, and the width of the leg and feet portions 54, may be rolled or deformed into the curvilinear configuration shown for instance in FIG. 10, to form the aforementioned antenna or horn portions on the finished article.

It will be seen that the slits defining the antenna portions extend well through the neck portion of the blank and into the head, so that when deformed, they will be in proper location to give the desired appearance to the finished article. In this arrangement of blank, the arm or wing portions are bent forwardly rather than rearwardly, and as shown in FIG. 8, into smoothly flowing curved sections.

In this arrangement of blank, the distance between the intermost end of the respective slit 51 partially defining one of the foot and leg portions 54 and the longitudinal axis Z—Z of the strip 12, is approximately the same as the distance between the innermost end of the slit 52 partially defining one of the arm or wing portions 56 and the axis Z—Z of the strip. The head portion and eye sections of the embodiment illustrated in FIG. 10 may be formed similarly to those of the aforediscussed embodiments of articles.

While the blanks after being cut from the strip of stock material could be formed by hand into the finished article, it will be understood that they likewise can be formed by machine processing, and as by passing the blank through suitable pressure dies to cause deformation of the selected sections of the blank into the smoothly curved configuration of finished articles illustrated. In the case of the use of plastic material, heat would preferably be applied to the blank along with pressure to form the curved configuration of the finished article.

From the foregoing description and accompanying drawings, it will be seen that the invention provides a novel process for producing articles from sheet-like strip material, such as for instance, stainless steel, or plastics or the like, and a process wherein repetitive patterns or blanks are cut from the strip of material, with the blanks being symmetrical about the major axis of the blank, and with the blank being defined exteriorly by smoothly curving lines made by the smoothly curving cuts in the strip material, and with other cuts made in the blank defining sections which are adapted to be subsequently bent or deformed into predetermined configuration to define the finalized portions of the figure, and with the blanks being reversed alternately end-to-end during the cutting operation and maintaining the exterior defining peripheries of the blanks in interfitting juxtaposed condition to maintain minimum or zero loss of scrap in the stock strip. The invention also provides novel finished articles which are expeditiously formed from a blank cut out of flat strip material and in a manner whereby scrap loss in the strip of material is maintained at a minimum or zero condition.

The terms and expressions which have been used are used as terms of description and not of limitation and there is no intention in the use of such terms and expressions of excluding any equivalents of any of the features shown or described, or portions thereof, and it is recognized that various modifications are possible within the scope of the invention claimed.

What is claimed is:

1. In a method of producing figures from sheet-like relatively rigid stock material, comprising, providing a strip of said stock material, cutting blanks from said strip of material of individual items which are substantially symmetrical about the major axis of the respective blank, said axis extending generally transverse of the longitudinal axis of said strip, each said blank being defined at least in part by smoothly curving lines defining the greater part of the exterior configuration of said blank and comprising cuts made in said strip, said cuts being formed generally symmetrically on opposite sides of said major axis of the respective blank, each said blank comprising a body portion, a neck portion and a head portion with said body portion being of larger area as compared to said head portion, making other cuts in said blank body portion, said other cuts defining at least in part sections of the blank which are adapted to be subsequently bent into predetermined configuration to define finalized portions of the figure, reversing alternate blanks end to end during the blank cutting operation thereof and locating the exterior defining peripheries of said blanks in interfitting juxtaposed condition during the blank cutting operation to obtain minimum scrap loss in the stock strip, and including detaching each blank from said strip and bending said neck portion of each said blank into a smoothly curved configuration in the process of producing the finalized figure.

2. A method in accordance with claim 1 wherein the first mentioned cuts are commenced in said strip generally along one side edge of said strip and are extended to substantially the other side edge thereof.

3. A method in accordance with claim 1 wherein the first mentioned cuts are made simultaneously in said strip extending from one side edge thereof to the other side edge thereof.

4. A method in accordance with claim 1 wherein every other blank is of a different exterior configuration as compared to the adjacent blanks, said blanks being formed complementary to one another at the juxtaposition of their exterior configuration, so as to provide for generally zero stock loss during formation of the blanks from said strip.

5. A method in accordance with claim 1 including the step of bending said sections of the cut blank into predetermined configurations, for providing the finished article.

6. A method in accordance with claim 1, including making said other cuts simultaneously with the first mentioned cuts.

7. A method in accordance with claim 1 wherein the exterior defining side edge of each of said blanks comprises a curvilinear S-shaped configuration.

8. A method in accordance with claim 1 wherein said other cuts are of smoothly curved configurations, symmetrical on opposite sides of said axis, with the last mentioned cuts being located primarily in said body portion.

9. A method in accordance with claim 1 including forming a plurality of slits in said head portion commencing at the respective side edge of the strip, and terminating in said head portion to define eye anchoring tabs, said tabs being adapted to be subsequently bent into curvilinear configuration about an axis extending transverse of said head portion for mounting eye representing means thereon.

10. A method in accordance with claim 9 including means formed in said head portion at the respective side edge thereof and intermediate said head slits for facilitating subsequent deformation of said head portion symmetrically about said axis.

11. A method in accordance with claim 9 including mounting eye representing means on said tabs, said eye representing means comprising laterally disposed eye members of disc-like form connected by resilient means, said resilient means drawing said eye members into engagement with said head portion.

12. A method in accordance with claim 1 wherein the surface of said stock material is a mirror finish, and providing means protecting said finish during formation of said blanks.

* * * * *